United States Patent
Tankala et al.

[11] Patent Number: 5,865,571
[45] Date of Patent: Feb. 2, 1999

[54] NON-METALLIC BODY CUTTING TOOLS

[75] Inventors: Kanishka Tankala, Southbridge; Rakesh Kapoor, Shrewsbury, both of Mass.; Gary E. Johnson, Fullerton, Calif.; Ronald D. Grieger, Shrewsbury, Mass.

[73] Assignee: Norton Company, Worcester, Mass.

[21] Appl. No.: 877,382

[22] Filed: Jun. 17, 1997

[51] Int. Cl.$^6$ ..................................................... B23B 35/00
[52] U.S. Cl. .......................... 408/1 R; 408/144; 408/204; 408/230; 451/542
[58] Field of Search .................................. 408/1 R, 144, 408/145, 204, 207, 227, 230, 226, 231; 451/548, 542, 543

[56] References Cited

U.S. PATENT DOCUMENTS

| | | | |
|---|---|---|---|
| 3,382,743 | 5/1968 | Trevathan | 408/144 |
| 4,393,590 | 7/1983 | Pantzar | 30/387 |
| 4,821,465 | 4/1989 | Tomlinson et al. | 51/283 R |
| 5,069,584 | 12/1991 | Obermeier et al. | 408/145 |
| 5,125,774 | 6/1992 | Catenacci | 408/232 |
| 5,387,059 | 2/1995 | Borzemsky | 408/226 |
| 5,408,983 | 4/1995 | Sawluk | 125/15 |
| 5,411,010 | 5/1995 | Mummenhoff | 125/15 |
| 5,454,752 | 10/1995 | Sexton et al. | 451/548 |
| 5,611,649 | 3/1997 | Matthias | 407/118 |
| 5,649,796 | 7/1997 | Durney | 408/211 |

FOREIGN PATENT DOCUMENTS

| | | |
|---|---|---|
| 2010229 | 2/1990 | Canada . |
| 2071721 | 6/1992 | Canada . |
| 3-234474 | 10/1991 | Japan . |

OTHER PUBLICATIONS

"Laminated Diamond Blade Reduces Dry Sawing Noise" IPRI Sep./Oct. 1987, p. 19, Auther unknown.
"Coring Unconsolidated Sands In The Gulf Of Mexico" Drilling, Sep./Oct. 1988, pp. 33/35. by Jamie Wilcox.
"PTA Proves Its Worth In High–Volume Hardfacing Jobs" Welding Journal, Feb. 1996, pp. 34/40 by D. Raghu and R. Webber.

*Primary Examiner*—Daniel W. Howell
*Assistant Examiner*—Adesh Bhargava
*Attorney, Agent, or Firm*—Sampson & Associates, P.C.; Mary E. Porter, Esq.

[57] ABSTRACT

A drill bit is provided with a cylindrical body portion fabricated from a plastic material. The body portion is fastened in concentric, end to end relation to a cylindrical cutter fabricated from a metallic material and having an array of cutting elements disposed thereon. The body portion and cutter are preferably tubular, wherein the cutting elements are disposed in an annular array, to facilitate core or crown drilling operations. The wall thickness of the tubular body portion may be increased relative that of the cutter to compensate for wear during drilling.

44 Claims, 4 Drawing Sheets

NON-METALLIC BODY CUTTING TOOLS

BACKGROUND OF THE INVENTION

1. Field of the Invention

This invention relates to cutting tools and more particularly to use of plastic materials for fabrication of cutting tools adapted to cut circular holes or bores.

2. Background Information

Metallic materials are commonly used to fabricate the main bodies of cutting tools. For example, steel is typically used to fabricate tubes and discs to serve as the main bodies of core bits and circular or disc-shaped saw blades, respectively. Cutting elements, such as abrasive elements or cutting teeth are brazed, laser welded, mechanically fastened to, or formed integrally with, the steel core. Such steel cores operate satisfactorily in a wide range of applications. However, they are not without drawbacks. In particular, metallic cores are relatively heavy, thus tending to make such cutting tools cumbersome and difficult to handle in certain applications. Metallic cores also disadvantageously tend to vibrate and generate noise during cutting operations. Moreover, metallic cores are relatively expensive and comprise a significant portion of the overall cost of the cutting tool.

Some of these problems have been recognized and attempts made to address them with respect to disc-shaped cutting tools. For example, U.S. Pat. Nos. 5,408,983 and 5,411,010 both disclose circular saw blades and/or cutting discs that utilize reinforced plastic composites in the disc-shaped main body portion thereof. These configurations may provide such advantages as reduced tool weight and noise reduction.

Use of similar materials, and the advantages associated therewith, have not, however, been carried over to cylindrical core bit type cutting tools. This is presumably due to the significant distinctions between core bit and circular disc cutting tools and the cutting applications for which they are used. Indeed, it is generally understood by those skilled in the art that these two types of elements operate in distinctly different cutting regimes, each with a unique set of parameters that are not transferable therebetween. In this regard, data and methodology such as techniques, guidelines and accepted practices in terms of cutting rates, materials and cutting speeds associated with conventional disc-shaped cutting tools are generally inapplicable to cylindrical core bit-type cutting tools.

As an example of these differences, peripheral speeds at which each individual cutting tip or tooth moves through the workpiece, are vastly different. For instance, conventional diamond tipped circular (disc) blades commonly used for cutting hard materials, such as, for example, concrete, typically range from approximately 4 inches (102 mm) to 48 inches (1219 mm) in diameter. Conventional recommended operational speeds in rotations per minute (rpm) for these blades yield a preferred peripheral speed of approximately 49 meters per second (m/s).

On the other hand, diamond segmented core bits commonly utilized for cutting similar material (concrete), range in diameter from approximately 0.4 inches to 10 inches (10 mm to 250 mm) and may be as large as 36 inches (900 mm) or more in some applications. Recommended operational speeds in rpms yield a recommended peripheral speed of approximately 2.5 m/s. Such a wide discrepancy in peripheral speed, of more than an order of magnitude, is indicative of the non-analogous nature of these two distinct cutting tool types. Similar discrepancies in peripheral speed pertain to various cutting applications and workpiece materials, including, for example, asphalt, stone, reinforced concrete, limestone, silicon quartz, glass, etc.

Another factor that tends to militate against the use of plastic materials in core-bit applications is the relatively abrasive environment encountered by the body of the bit, relative to bodies of circular disc type blades, due to prolonged contact with grinding swarf. In this regard, during each revolution of a conventional disc type blade, an individual tooth or diamond enters the workpiece, removes some of the workpiece to thereby cut a kerf therein, then exits the workpiece. The removed material, along with any cutting lubricant or coolant, forms a relatively abrasive grinding swarf that is effectively carried through the kerf by the tooth and expelled therefrom as the tooth exits the kerf. In this manner, the swarf is effectively removed from the kerf (and from contact with the cutting tool) nominally as fast as the swarf is produced. The abrasive grinding swarf thus tends to contact only the teeth or cutting elements, rather than the relatively abrasion sensitive plastic composite body portion of the disc.

In contrast, the nature of core drilling applications requires the cutting teeth or diamonds to remain in the kerf until the cutting operation is complete. Accordingly, during most conventional cutting operations, the swarf, having no other space to occupy, tends to remain in the kerf where it climbs up the tube, carried by cutting liquid, as cutting progresses. Thus, in such cutting applications, the swarf remains in contact with the body of the core bit throughout the cutting operation. The deeper the cut or kerf, the greater the area of contact with the core body. This prolonged contact of the abrasive swarf with the cutting tool presents relatively aggressive working conditions to any components thereof fabricated from relatively soft and abrasion sensitive plastic materials.

Another aspect of core drill operation is that all cutting elements continuously cut the workpiece during operation. The cutting elements of a saw blade cut in an intermittent, interrupted fashion as each one of the elements rotates in and out of contact with the workpiece. Thus, the thermal stresses are higher in core drill operation than in saw blade operation.

Therefore, it is unexpected that a core drill bit made with a plastic core body can be used to cut concrete and other hard materials. It is even more unexpected that such a tool would have a useful life at least as long as a comparable tool made with a steel core.

SUMMARY OF THE INVENTION

According to one aspect of the invention, a cutting tool adapted to cut a circular hole in a workpiece, includes:

a cutter of substantially cylindrical configuration including an array of cutting elements, the cutter having a cutting end and a coupling end;

a shaft of substantially cylindrical configuration fabricated from a non-metallic material, the shaft having a cutter engagement end and a drill engagement end;

the cutter and the shaft adapted for concentric, end to end engagement with one another wherein the coupling end is substantially rigidly engaged with the cutter engagement end;

the drill engagement end being adapted for operative engagement with a drill for rotation of the cutting tool about the concentric axis.

In a second aspect of the invention, a non-metallic body is provided for a cutting tool adapted to cut a circular hole in a workpiece. The cutting tool has a cutter of substantially cylindrical configuration, including an array of cutting elements, the cutter having a cutting end and a coupling end. The non-metallic body includes:

a shaft of substantially cylindrical configuration, the shaft having a cutter engagement end and a drill engagement end;

the shaft adapted for concentric, end to end engagement with the cutter wherein the cutter engagement end is substantially rigidly engaged with the coupling end;

the drill engagement end adapted for operative engagement with a drill for rotation of the cutting tool about the concentric axis.

In a third aspect of the invention, a method of drilling a hole in a workpiece includes the steps of:

(a) providing a cutting tool comprising:
 i) a cutter of substantially cylindrical configuration, including an array of cutting elements, the cutter having a cutting end and a coupling end;
 ii) a shaft of substantially cylindrical configuration fabricated from a non-metallic material, the shaft having a cutter engagement end and a drill engagement end; and
 iii) the cutter and the shaft adapted for concentric, end to end engagement with one another wherein the coupling end is substantially rigidly engaged with the cutter engagement end;

(b) fastening the drill engagement end to a drill;

(c) operating the drill to rotate the cutting tool about the concentric axis; and (d) engaging the cutting end with the workpiece.

The present invention thus utilizes non-metallic materials in fabrication of cutting tools to obtain advantages such as weight and/or cost reduction relative the prior art.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Figure 1:
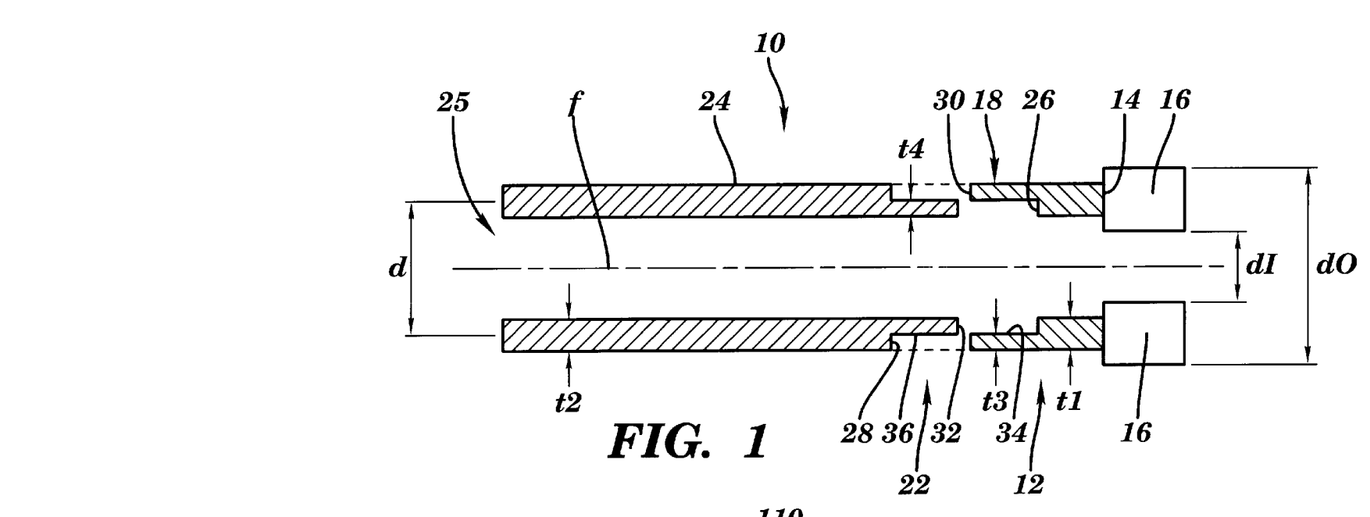
FIG. 1 is a cross-sectional, elevational, exploded, schematic view of an embodiment of a non-metallic body cutting bit of the subject invention.
Figure 7:
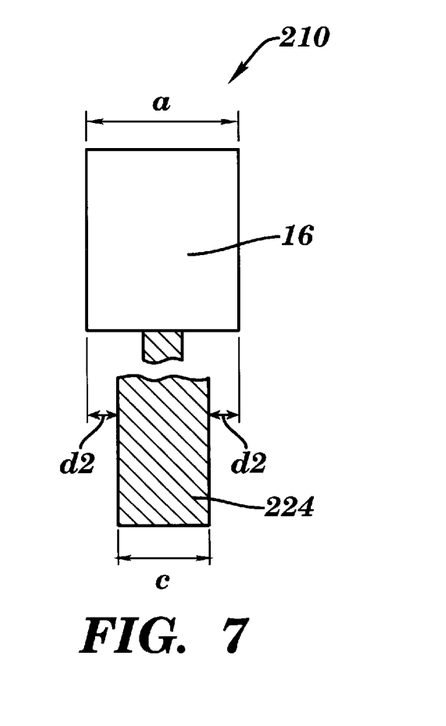
FIG. 7 is a view similar to that of FIG. 6, of another embodiment of the present invention.

Briefly described, as shown in FIG. 1, the present invention comprises a cylindrical cutting tool or bit 10 for cutting circular holes in a workpiece. Bit 10 is provided with a cylindrical body 24 fabricated from a plastic material. The body portion is fastened in concentric, end to end relation to a cylindrical cutter 12 fabricated from a metallic material and including an array of cutting elements 16 disposed thereon. In a preferred embodiment, bit 10 comprises a core bit, in which body 24 and cutter 12 are substantially tubular, with the cutter including cutting elements disposed in an annular array thereon, to facilitate core or crown drilling operations. As shown in FIG. 7, wall thickness c of tubular body 224 may be increased relative that of cutting element 16 to compensate for wearing of the relatively soft body during drilling. Along these lines, any number of techniques may be utilized to improve wear resistance, such as for example, surface hardening plastic body 224 or increasing the thickness or radial dimension of cutting elements 16 relative to wall thickness c.

Where used in this disclosure, the term "cutting bit" or "bit" shall refer to any cylindrical cutting tool having an array of cutting elements thereon and adapted to rotate for cutting a circular hole in a workpiece, including, for example, conventional core bits, hole or crown saws and solid core drill bits. The term "core bit" shall refer to any drill bit of tubular or hollow construction, including, for example, cutting tools commonly used with conventional core drills, as well as conventional crown saws or hole saws. The term "axial" when used in connection with an element described herein, shall refer to a direction relative to the element, which is substantially parallel to its center of rotation or concentric axis f as shown in FIG. 1. Similarly, the term "transverse" or "radial" shall refer to a direction substantially orthogonal to the axial direction.

Referring now to the drawings in detail, as shown in FIG. 1, one embodiment of the present invention includes a cutting bit 10 formed as a core bit of the type commonly referred to as an open-end core bit. As shown, bit 10 includes a cutter 12 of substantially cylindrical construction. The cutter has an annular cutting end 14 including an array of conventional cutting elements 16 disposed thereon. Cutting elements 16 may include any number of cutting devices as known in the art, such as, for example, conventional bonded abrasive segments 17 brazed, welded or otherwise fastened to ring 12, as shown in FIG. 5.

Figure 5:
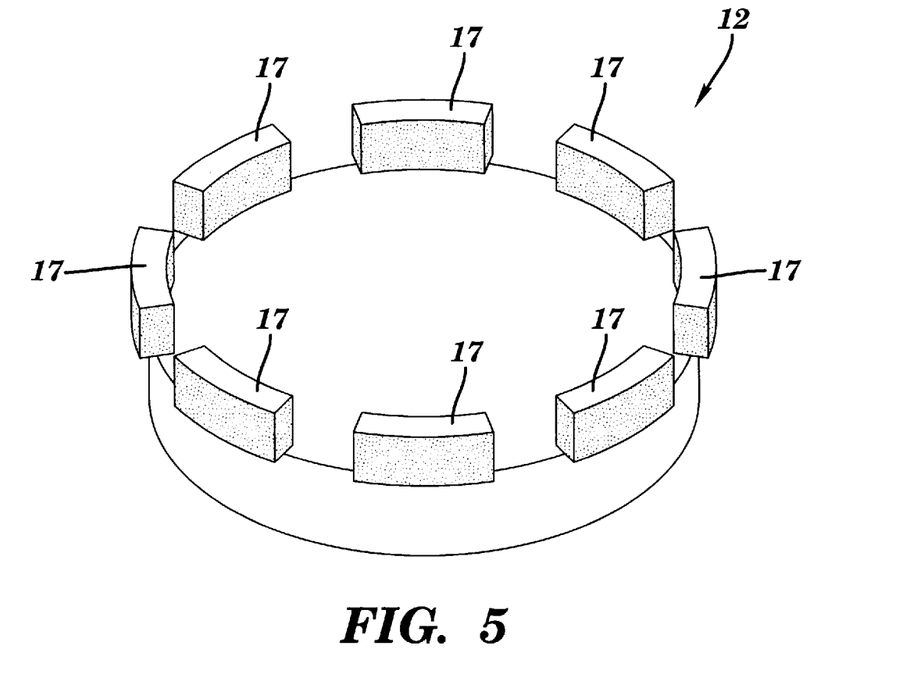
FIG. 5 is a perspective schematic representation of an embodiment of a cutter of a non-metallic body cutting bit of the type shown in FIGS. 1 and 2.

In this regard, turning now to FIG. 5, the number of discrete segments 17 and their spacing around the edge of ring 12 to which they are attached can vary somewhat depending on the size of the ring, the size of the body and the cutting application. In general however, for core drill bits having a diameter of from about 50 mm to 500 cm, from about 2 up to several hundred segments 17 may be used. Smaller or larger diameter drill bits may use fewer or more respectively. The abrasive component or grain of segments 17 may be any one of those commonly used for such applications, the grit being chosen depending on the hardness of the material to be cut. Thus the grain may be aluminum oxide, silicon carbide, silicon nitride, tungsten carbide, a superabrasive such as diamond or cubic boron nitride (CBN), alumina, seeded or unseeded sol-gel alumina or other abrasive grains and combinations of abrasive grains. Superabrasives are usually preferred though the superabrasive component may be diluted with less expensive abrasive grits. The abrasive is typically held in a metal bond or matrix and the adhesion to the bond may be enhanced by metal coating the grain with a metal such as titanium, before it is incorporated in the segment. The metal matrix may comprise cobalt, iron, bronze, nickel alloy, tungsten carbide, chromium boride or other metals and their alloys and mixtures. Materials reactive with diamond, CBN or other grains, such as titanium, chromium, tungsten, molybdenum, and mixtures thereof, may be added to the metal matrix to strengthen the bond.

Segments 17 may be thus provided with substantially any known composition, including, for example, providing the segments with at least two circumferentially spaced regions wherein superabrasive grains are alternately dispersed in the regions in high and low concentrations of superabrasive grains. Segments of this type are disclosed in U.S. Pat. No. 5,518,443 which is hereby incorporated by reference in its entirety, herein.

The segments are preferably secured to ring 12 by conventional welding or brazing techniques. As shown in FIG. 5, conventional segments 17 generally have a substantially elongated or rectangular cubic configuration with one long edge being welded or brazed to ring 12. As also shown, in a core bit embodiment, segments 17 are curved or bowed along their lengths to allow the long edge to conform to the annular edge of the ring 12 to which it is secured. Thus the segments project axially from the ring by the amount of their width. The thickness or radial dimension c of the segments is conventionally the same as, or greater than, the thickness of the ring and body to which they are secured.

An example of segments capable of use in conjunction with the present invention include a bond of a 70/30 (percent) cobalt/bronze mixture with the grain being DeBeers SDA 85+ diamond (e.g., 30–50 mesh) in a concentration of 7.5 vol % (volume percent). Each segment has a length of 25.4 mm and a radial or kerf dimension of 3.2 mm.

Alternatively, the cutting elements may include teeth formed integrally with ring 12 with or without additional treatment to increase the hardness or abrasive aspects thereof. In this regard, for example, cutting elements 16 may include integral teeth having a single layer of abrasive grains chemically bonded thereto in the manner disclosed in commonly assigned U.S. patent application Ser. No. 08/616,538 which is hereby incorporated by reference in its entirety, herein. Teeth fabricated in this manner are referred to hereinbelow as "contoured, brazed, single layer abrasive tools" or alternatively, "contoured cutting elements."

Ring 12 also includes an annular shaft engagement end or coupling end 18, which, as shown, is preferably fabricated as a female coupling or socket. Engagement end 18 is adapted to engage a ring engagement end 22 of a substantially cylindrical non-metallic body, shaft or tube 24. Engagement end 22 is preferably fabricated as a male coupling or plug as shown.

Ends 18 and 22 are sized and shaped to maintain shaft or tube 24 and ring 12 in concentric, end to end engagement with sufficient structural integrity to withstand torsional and axial loading common to core or hole drilling applications, without slippage or breakage. Moreover, ends 18 and 22 are preferably bonded to one another in their engaged positions using a predetermined bonding agent or adhesive, as will be discussed hereinbelow.

Non-metallic shaft 24 extends a predetermined axial distance from ring engagement end 22 and terminates at a drill engagement end 25 that is open in the manner characteristic of conventional open-end type core bits. Drill engagement end 25 is adapted to receive a fixture (not shown) commonly used with open-end type metal-body core bits, to secure bit 10 to a drill motor (not shown) of a conventional core drill.

In this regard, during drilling operations, bit 10 is adapted to rotate about concentric axis or axis of rotation f so that the array of cutting elements 16 will form a notional cylinder having an inner diameter dI and an outer diameter dO, as will be discussed in greater detail hereinafter.

In a preferred embodiment as shown, ring 12 and tube 24 are each provided with inner and outer diameters that define predetermined wall thicknesses t1 (cutter wall) and t2 (tube wall), respectively. Wall thicknesses t1 and t2 are substantially uniform along the length or axial dimension of the tube and cutter, with the exception of engagement ends 18 and 22. Engagement ends 18 and 22 are each fabricated as stepped-diameter portions of ring 12 and tube 24, respectively. In this regard, the engaged end portions of the ring and tube are provided with predetermined wall thicknesses t3 and t4, substantially thinner than wall thicknesses t1 and t2, respectively.

Wall thicknesses t1, t2, t3 and t4 are predetermined so as to enable cylindrical surfaces 34 and 36 of engagement ends 18 and 22 to interengage one another in a manner ranging from an interference to a sliding fit, while preferably providing sufficient clearance for application of an adhesive material therebetween.

As shown, steps 26 and 28, and end faces 30 and 32 each extend substantially orthogonally to the axial direction. In this manner, the engaged steps and end faces are adapted to transmit the axial loading of the bit between ring 12 and tube 24, nominally without transmitting a component thereof in the radial direction during cutting operations. In the event the mating steps and end faces were disposed at oblique angles relative the axial direction, axial loading may tend to disadvantageously deflect tube 24 radially proximate ring engagement end 22 thereof.

Surfaces 34 and 36 are preferably provided with substantially identical axial dimensions so that steps 26 and 28, and faces 30 and 32, may be bonded in respective surface to surface engagement with one another when engagement ends 18 and 22 are fully mated. These axial dimensions, moreover, are predetermined to provide sufficient contact area between surfaces 34 and 36, so as to, in combination with the dimensions of wall thicknesses t1, t2, t3 and t4, substantially prevent bit 10 from bending or buckling under the axial loading or weight on bit (WOB) loading common to conventional core drilling operations. Such WOB levels typically fall within a range of approximately 50–500 Kg.

With regard to the foregoing, the wall thicknesses are increased as the average diameter of bit 10 increases. The following Table I provides representative wall thicknesses used in commercial practice for various diameters of steel bodied core bits. The same wall thicknesses are preferably utilized for wall thicknesses t1 and t2 of ring 12 and polymer tube 24, respectively.

TABLE I

Representative core bit tube wall thicknesses for various core bit sizes.

| Core Bit Diameter, inch (cm) | Wall Thickness, inch (cm) |
|---|---|
| 0.5–1.0 (1.3–2.5) | 0.04 (.1) |
| 1.0–2.0 (2.5–5) | 0.06 (.15) |

TABLE I-continued

Representative core bit tube wall thicknesses for various core bit sizes.

| Core Bit Diameter, inch (cm) | Wall Thickness, inch (cm) |
|---|---|
| 2.0–6.0 (5–15.2) | 0.08 (.2) |
| 6.0–10.0 (15.2–25.4) | 0.1 (.25) |
| >10.0 (25.4) | 0.12 (.3) |

Wall thickness t4 of non-metallic tube 24 is preferably approximately one-half to two-thirds of wall thickness t2. Wall thickness t3 of ring 12 is sized to enable surface 34 thereof to slidably engage surface 36 as discussed hereinabove.

Ring 12 is preferably fabricated from a conventional metallic material such as steel and may be formed by any convenient process, such as by machining, extrusion or casting. In one preferred embodiment, ring 12 is fabricated in a manner commonly employed to fabricate conventional core bits, with tube engagement end 18 machined to provide wall thickness t3.

Non-metallic tube 24 may be fabricated from a variety of materials, such as, for example, plastics, plastic composites, wood composites, ceramics, ceramic composites and combinations, and metal particle or ceramic particle filled plastic, and combinations thereof. Preferred materials are Polyvinyl Chloride (PVC), acrylic polymer, glass fiber reinforced plastic (GFRP) and polyamide (nylon). Throughout this disclosure, the term "reinforcing materials" shall be understood to include fiber such as carbon fiber, glass fiber, graphite fiber, polyacrylonitrile (PAN) fiber, aramid fiber, boron fiber, silicon carbide fiber, metal fiber, and mixtures thereof, or other materials, such as wire mesh, silicon carbide whiskers, silicon nitride whiskers, calcium carbonate particles, aluminum silicate particles, aluminum oxide particles, silicon carbide particles, silicon nitride particles and mixtures thereof. These reinforcing materials may be added to substantially any plastic bond or matrix material, e.g., an epoxy resin reinforced with glass fibers. Similarly, the term "fiber reinforced plastic" shall be understood to include any plastic bond or matrix material including epoxy resin, reinforced with any suitable fiber such as, for example, carbon fiber, glass, polyacrylonitrile (PAN) fiber, and mixtures thereof.

In general, preferred non-metallic materials for use in fabrication of tube 24 include any thermoset or thermoplastic polymer, and their reinforced composites. The following Table II lists some of the many thermoset and thermoplastic polymers that may be utilized.

TABLE II

Polymeric materials and reinforcing materials for fabricating tool body.

| Thermosets | Thermoplastics | Reinforcing Materials |
|---|---|---|
| Polyester SMC | acrylics, cellulosic, | glass fiber: |
| epoxies | phenolic | S-glass or E-glass |
| phenolics | Polyethylene, | graphite fiber |
| amino plastics | Polypropylene | Aramid Fibers |
| unsaturated | PVC and other | (Kevlar) |
| polyesters | vinyl polymers | Polyacrylonitrile |
| | Polystryrene, | (PAN) fibers |
| | ABS, Acetal | Boron fibers |
| | nylon, | metal fibers or |
| | Polycarbonate | wire mesh |
| Polyether Sulphone, | | Calcium Carbonate |
| Polyimide, | | particles |
| Polyurethane | | Aluminum Silicate |
| Ultra High | | particles |
| Molecular Weight | | SiC particles |
| Polyethylene | | or whiskers |
| low density | | Silicon nitride |
| polyethylene | | particles or |
| | | whiskers |
| | | Aluminum oxide |
| | | particles |

Examples of core bits 10 fabricated from several of the above-referenced materials have been tested and found to perform comparably to conventional metallic core bits, as will be discussed in greater detail hereinafter.

Tube 24 may be fabricated by any convenient method, such as, for example, molding, machining or extrusion. For example, tube 24 may be extruded, followed by machining operations at ring engagement end 22 to provide wall thickness t4.

Any number of adhesives may be utilized to bond ring 12 to tube 24. In one example utilizing a tube 24 fabricated from PVC, an epoxy resin and hardener mixture sold under the designation Torr-seal®, available from Varian Vacuum Products of Lexington, Mass., was applied uniformly to the mating surfaces of tube engagement end 18 and ring engagement end 22, prior to assembly thereof, to bond the ends in mating engagement with one another. Also preferred for use in the assembly is an epoxy resin commercially available from Conap, Inc., Olean, N.Y., under the Easyepoxy tradename. Although these particular resins were used successfully, a variety of other adhesives may be used for joining the metal ring to the polymer tube. The choice of adhesive may be made based on the specific materials to be joined. Examples of additional adhesives generally suitable for joining metals to various plastics, that may be employed in this regard, include urethane, neoprene, nitrile, polyamide, polyester and cyanoacrylate adhesives. Melt lamination, wherein heat and pressure are used to join metal and plastic, may also be used to join the metal ring to the tube. Other joining methods include mechanical interlocking techniques, injection molding the tube in-situ with the metal ring, welding, optionally with resistant or induction heat, or with ultrasonics, riveting, and combinations of these methods. The metal ring may be keyed in a manner similar to that shown in FIG. 9. The ring may be interlocked with cut-outs disposed in the plastic body, or alternatively, molded integrally with the plastic body. Alternatively, the metal ring may be perforated and integrally molded to the plastic body.

Figure 9:
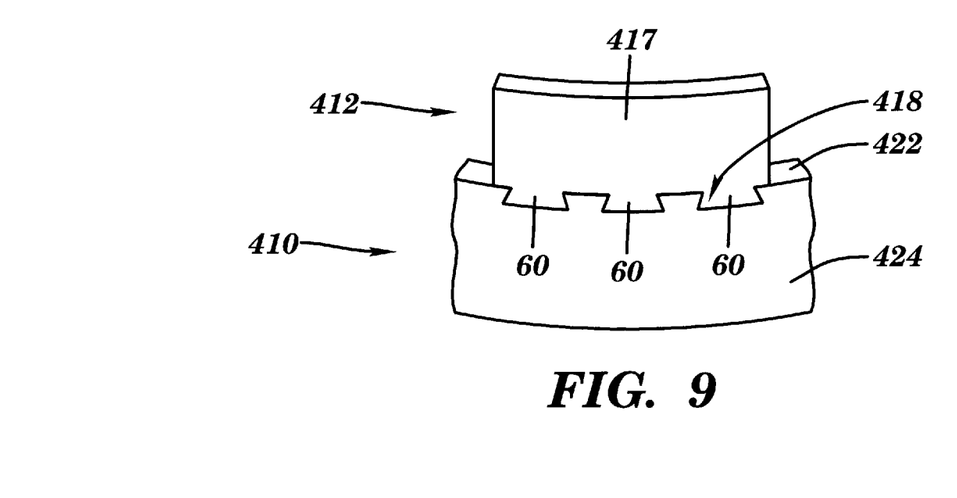
FIG. 9 is a perspective schematic representation of a portion of an additional embodiment of a non-metallic body cutting bit of the present invention.

Moreover, referring to FIG. 9, in an additional embodiment, the present invention includes a cutting tool 410 that effectively eliminates the metallic ring portion of cutter 12 and rather utilizes a cutter 412 that consists entirely of cutting elements or abrasive segments 417. As shown, abrasive segments 417 are keyed along one edge to provide a series of keys 60 adapted to be interlocked and/or integrally molded to plastic body 424 as shown. In this manner, keys 60 effectively comprise coupling end 418 of cutter 412, adapted for engagement with cutter engagement end 422 of body 424 as shown.

Figure 2:
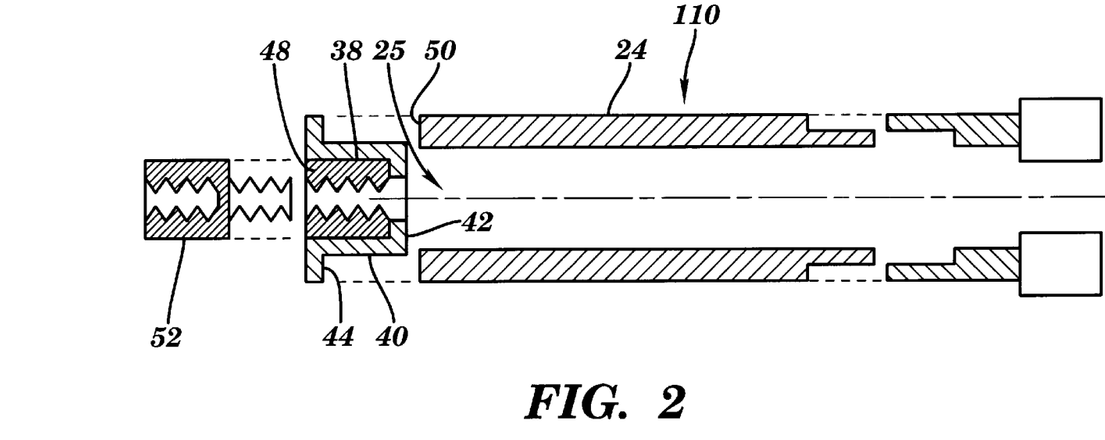
FIG. 2 is a cross-sectional, elevational, partially exploded schematic view of another embodiment of a non-metallic body cutting bit of the subject invention, including portions of means for mounting the cutting bit to a conventional drill motor.
Figure 3:
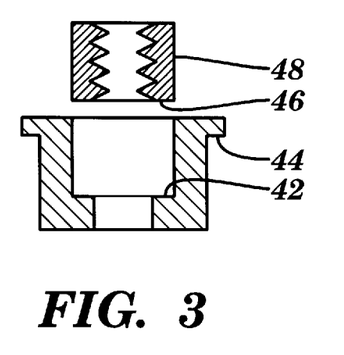
FIG. 3 is a cross-section, elevational, exploded schematic view of a portion of the non-metallic body cutting bit of FIG. 2.
Figure 4:
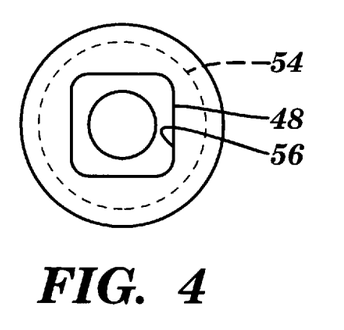
FIG. 4 is a plan view, with portions thereof shown in phantom, of the portion of the non-metallic body cutting bit of FIG. 3.

Referring now to FIGS. 2–4, an alternate embodiment of the present invention comprises a plastic bodied bit 110 fabricated as a conventional closed-end type core bit. Referring to FIG. 2, the configuration of bit 110 is substantially similar to that of open-end type bit 10, but for the provision of a closed end 126 by closing drill engagement end 25 with a drill end connector 38.

Drill end connector 38 includes an elongated tubular portion 40 adapted for receipt within drill engagement end 25. An insert retention flange 42 extends radially inward at one end thereof, while an axial compression flange 44 extends radially outward from the other end thereof. Flange 42 is adapted to engage leading face 46 of a threaded insert 48 and prevent relative movement therebetween when subjected to the aforementioned axial compressive loading. Flange 44 is adapted to engage end face 50 of drill engagement end 25 to similarly resist axial movement therebetween.

Insert 48 is adapted to threadably receive a conventional adapter 52 commonly utilized to secure closed-end type core bits to a core drill (not shown).

Referring now to FIG. 4, insert 48 is provided with a generally cylindrical outer surface 54 adapted for concentric, surface to surface engagement with tube 24. Inner surface 56, however, is provided with a non-circular (generally square, as shown, or hexagonal) transverse cross-section, sized and shaped to receive insert 48 in surface to surface engagement therewith. One skilled in the art will recognize that such non-circular construction advantageously serves to resist slippage between insert 48 and connector 38 due to torsional forces exerted therebetween during drilling operations. However, a circular construction may be used provided the tool is effective in the desired drilling operation.

Connector 38 is preferably fabricated from the same material, and in a similar manner as tube 24. In one test, for example, connector 38 was machined from solid PVC stock. The connector is bonded in fully mated engagement with tube 24, wherein flange 44 is engaged with end face 50, utilizing an adhesive of the type described hereinabove suitable for bonding plastic to plastic.

Insert 48 is fabricated in the manner and from materials similar to those utilized for ring 12. The insert is inserted and fastened to connector 38 in place as shown in FIG. 2 in a manner described hereinabove for joining bond ring 12 to tube 24. In a preferred embodiment, the insert is bonded in place using an adhesive as described hereinabove.

This construction thus advantageously fastens bit 110 to adapter 52 with sufficient strength to resist the torsional and axial forces attributed to conventional core drilling operations, nominally without the application of radial forces to tube 24. In this regard, conventional steel bodied core bits having open ends are generally secured to the adapter of the motor drill with a pressure fit coupling that serves to apply radially outward pressure on the inner surface of the tube. The present invention, by use of flanges 42 and 44 that extend radially, rather than obliquely relative the axial direction, thus advantageously transmits the axial WOB loading nominally without radial loading.

Figure 6:
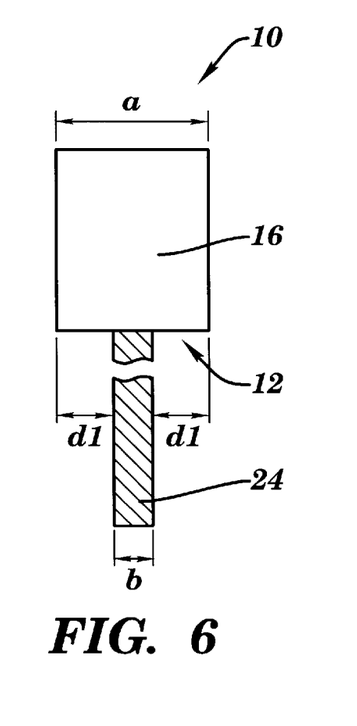
FIG. 6 is a cross-sectional schematic view similar to that of FIG. 1, on an enlarged scale, of a portion of a cutting bit of the type shown in FIG. 1.

Depending on the application and the plastic material utilized, tube 24 of the present invention may, during operation, abrade and thus decrease in wall thickness to some degree. However, as shown in FIGS. 6 and 7, this phenomenon may be compensated to minimize or effectively eliminate any potentially detrimental effects thereof. Referring to FIG. 6, bit 10 utilizes cutting elements 16 which, in a manner common to conventional core bits, initially have a radial dimension a that is greater than wall thickness b of tube 24.

Thus, the notional cylinder formed during the aforementioned rotation of the bit about its concentric axis f (FIG. 1) will have an inner diameter dI (FIG. 1) and an outer diameter dO (FIG. 1) which effectively provide a clearance d1 (FIG. 6) on either side of the tube wall. This clearance tends to reduce any abrasion and/or binding between tube 24 and the kerf to maintain cutting efficiency.

Conventional cutting elements 16, particularly those formed as conventional sacrificial-type grinding segments, tend to wear in the radial directions during use, wherein radial dimension a is reduced. Such wear effectively reduces clearance d1. Thus, in a standard core bit where a steel body is used, wall thickness b is determined to be the smallest capable of providing the bit with sufficient structural integrity. This minimal wall thickness is provided to maintain sufficient clearance d1 even after substantial segment wear, to effectively prolong the usable life of the core bit. Fabrication of the tubes with such minimal thickness is desirable because the steel does not wear appreciably during cutting operations.

Referring now to FIG. 7, an additional embodiment of the present invention includes a polymer bodied bit 210 that is substantially similar to bits 10 and 110, with the exception of providing a relatively thicker plastic tube 224. As shown, tube 224 is provided with a predetermined initial wall thickness c determined to compensate for reduction thereof due to wear during drilling operations. In this manner, as shown, wall thickness c may be initially greater than the thickness of a comparable steel body, such as thickness b, (FIG. 6) while still being less than segment width a, (i.e., c<a) to provide adequate clearance d2 relative a fresh (unworn) segment 16. Subsequent wear of the segment will be accompanied by wear of the tube 224 to effectively maintain adequate clearance d2 throughout drilling operations. This will advantageously provide a relatively longer useful life of bit 210, nominally without the threat of binding when radial dimension a decreases, provided that the wear rate of the tube wall is equal or greater than the wear rate of the segment thickness. Stated another way, dc/dt should be greater than or equal to da/dt, where dc/dt is wear rate of the polymer wall and da/dt is the wear rate of the segment thickness.

Core bits made with four types of polymeric materials have been tested by drilling cores in concrete blocks. The testing was conducted at 20 Amp constant current, 600 rpm spindle speed and 1 gal/min (3.8 liters/min) coolant flow rate. The concrete blocks used for testing were made with the following mix and design:

| Ingredient | Weight % |
| --- | --- |
| Cement: | 17 |
| Granite aggregate (¾" or 2 cm avg. size) | 40 |
| Sand | 34 |
| Water | 9 |

The blocks cast were 36" (91.4 cm) long, 18" (45.7 cm) wide and 12" (30.5 cm) high. Each block was cast with ⅝" (1.6 cm) diameter rebar (60 kpsi, 41 kN/cm$^2$ steel). The compressive strength of the concrete blocks is 7 kpsi (4.8 kN/cm$^2$)

The four polymeric materials used for fabricating the tested core bits include PVC, Acrylic, nylon and glass fiber reinforced plastic (GFRP). Any recorded decrease in wall thickness for the polymer body bits is presented along with the performance data. Table III below summarizes the performance of the bits for each of the polymer materials.

The segment wear performance, the wall thickness wear of the body, the rate of penetration (ROP), the average weight on bit (WOB) and the maximum weight on bit is set forth for each example. The corresponding values for a typical metal body core bit are also presented.

TABLE III

Summary of the tests conducted on various types of polymer core bits.

| Core Bit Body | Wall Thickness Wear | Segment Wear, M/mm* | ROP, cm/min | WOB, Kg Average | WOB, Kg Maximum |
|---|---|---|---|---|---|
| PVC | 0.0148" (0.038 cm) (after 27 holes drilled) | — | 5.2 ± 0.4 | 119 ± 6 | 171 |
| Acrylic | 0.0062" (0.016 cm) (after 31 holes drilled) | 2.39 | 7.2 ± 1.3 | 124 ± 4 | 300 |
| GFRP | — | 2.34 | 6.5 ± 0.4 | 205 ± 13 | 266 |
| Nylon | 0.0399" (0.101 cm) (after 165 holes drilled) | 16 | 6.4 ± 0.1 | 181 ± 23 | 349 |
| Metal (steel) | — | 15.9 | 6.3 ± 0.7 | 184 ± 22 | 328 |

*Meters drilled per millimeter wear of abrasive segments.

The test results indicate that all of the polymer body bits performed within generally acceptable ranges without failure. Moreover, in the case of the nylon-body core bit, the cutting elements or segments attached thereto were the same type as those attached to the metal-body core bit. Thus, in this case, a direct comparison of the segment wear performance and rate of penetration of these bits indicates that performance of the nylon body core bit is comparable to that of the metal body bit. The remaining core bits utilized cutting elements representative of conventional cutting applications, but that were not identical to those attached to the metal body. Thus, a direct comparison of segment wear characteristics may not be useful.

Various 4" (10.2 cm) diameter core bits with metal bodies and polymer bodies have been weighed to determine the weight savings while using a polymer body core bit. The following Table IV below summarizes the measurements. As shown, the polymer body core bits are over 50 percent lighter than comparable steel body bits. Moreover, it is anticipated that the weight of the polymer body core bits may be still further reduced by further reductions in the size of the metal portions of the polymer body bits.

TABLE IV

Comparative weights of steel body and polymer body segmented 4" (10.2 cm) outer diameter core bits.

| Manufacturer | Type | Length, cm | Weight, Kg |
|---|---|---|---|
| Diamond Products (US) | Steel | 37 | 3.23 |
| Truco (US) | Steel | 39 | 2.83 |
| Nimbus (Europe) | Steel | 45 | 3.73 |
| Van Moppes (Europe) | Steel | 50 | 3.60 |
| Norton (US) | Steel | 37 | 2.78 |
| Norton | nylon | 37 | 1.20 |
| Norton | PVC | 37 | 1.29 |
| Norton | Acrylic | 37 | 1.28 |

As mentioned hereinabove, the present invention may be utilized in combination with integral teeth such as, for example, the aforementioned contoured cutting elements.

Metal and polymer body core bits with contoured cutting elements were tested in cinder block. The cinder blocks are masonry blocks similar to those described hereinabove, but having fine (less than 0.25 in or 0.64 cm) aggregate. The testing was conducted at a 20 Amp constant-motor current, 600 rpm spindle speed, and 1 gal/minute (3.8 liters/min) coolant (water) flow rate. The bit wear performance, the rate of penetration (ROP), the average weight on bit (WOB), the maximum weight on bit and the wear performance of the metal and polymer tube wall were recorded. Table V below summarizes the performance of the bits.

The life of the nylon body contoured cutting element bit is comparable to that of the steel body bit. The ROP of the nylon bit is similar if not slightly better than, the steel body contoured cutting element bit. The data shows the performance of the nylon body core bit is comparable to, if not better than, that of the metal body contoured cutting element bit. The weight on bit (WOB) data indicates that the nylon body bit experienced loads similar to the metal body bit and performed well without experiencing any difficulty. Earlier testing of different polymer tubes suggested that a variety of polymer tubes can perform the same function as the steel tube. Thus, it is expected that polymer tubes other than nylon also can be successfully used for contoured cutting element tools.

TABLE V

Summary of the tests conducted on polymer and steel body contoured cutting element core bits.

| Core Bit Body | Wall Thickness Wear | Wear performance, M/mm* | ROP, cm/min. | WOB, Kg Average | WOB, Kg Maximum during test |
|---|---|---|---|---|---|
| nylon | 0.013" (0.03 cm) | 5.3 | 19.4 ± 3.1 | 106 ± 10 | 374 |
| Metal (steel) | 0.004" (0.01 cm) | 5.5 | 16.4 ± 3.9 | 98 ± 15 | 392 |

*Meters drilled per millimeter wear of abrasive segments.

The wear of the steel tube section and polymer tube section was monitored. It was observed that over the life of the bits, the nylon tube wall wore by a total of 0.013" (0.03 cm) while the steel tube wall wore by about 0.004" (0.01 cm). Although the wear of the polymer tube is higher, the nylon tube had sufficient wall thickness to withstand the stresses during drilling through out the life of the bit.

As shown in the following Table VI, the weight of the polymer contoured cutting element core bit compares favorably to that of a conventional steel body contoured cutting element core bit.

TABLE VI

Comparative weights of steel body and polymer body contoured cutting element core bits.

| Type | Length, cm | Weight, Kg |
|---|---|---|
| Steel | 30 | 3.80 |
| nylon* | 30 | 2.46 |

*The contoured cutting element bits have a heavy end connector made of steel. The weight of this may be reduced by replacing at least a part of it with polymer material (as in the case of segmented bits). This should further reduce the weight of the polymer bit significantly.

Figure 8:
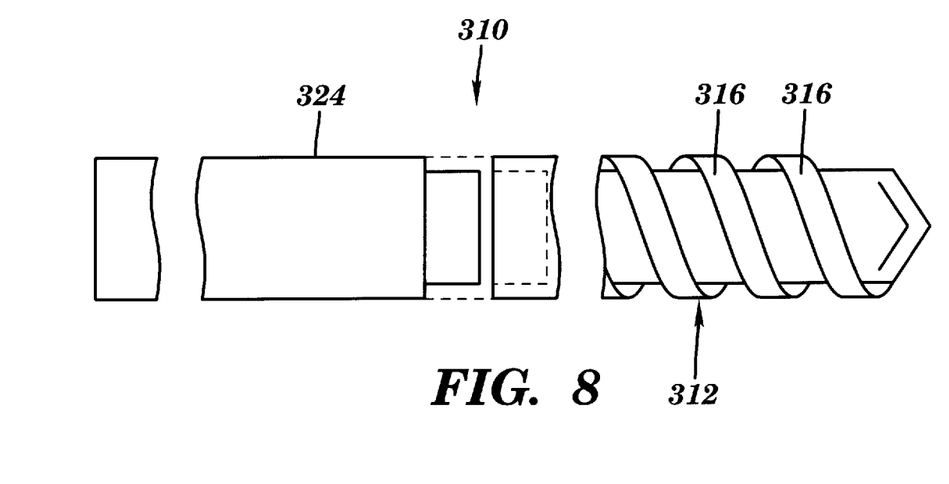
FIG. 8 is an elevational, schematic view of still another embodiment of the present invention.

In addition to the hollow core embodiments described hereinabove, it is contemplated that the present invention may be practiced using conventional solid core drill bits. In this regard, attention is directed to FIG. 8, in which an additional embodiment of the present invention is shown as bit 310. Bit 310 is fabricated as a conventional solid core drill bit of the type commonly used for hole drilling operations in materials such as wood, metal, plastic, masonry, brick, etc. As shown, bit 310 is substantially similar to bit 10, with the exception that plastic shaft 324 is substantially solid and cutting elements 316 comprise helical threads of the type common to conventional solid core drill bits. In this regard, the helically threaded cutting elements 316 may comprise tungsten carbide inserts brazed onto the bit, steel (for use in high speed drilling operations) or the aforementioned contoured cutting elements using for example, diamond abrasive.

The present invention as described hereinabove and as illustrated in the preceding test data, produced results that were both non-obvious and surprising in light of the teachings of the prior art also described hereinabove. In this regard, as discussed hereinabove, plastic materials tend to be particularly susceptible to abrasion. In core or hole drilling applications, the main body of a bit remains in the kerf or bore throughout the entire cutting operation. This contrasts with circular disc cutting operations in which the blade is disposed within the kerf for only a portion of each blade revolution. One may thus expect this relatively increased contact of the main body with the kerf in drilling operations to increase the potential for abrasion and failure of the plastic body. As shown, however, the plastic core gives acceptable performance.

Another concern militating against success of a polymer body cutting bit is abrasion due to prolonged contact with the grinding swarf. As also discussed hereinabove, nominally only the outer periphery of a circular disc blade contacts the swarf. In contrast, in core or hole drilling operations, the swarf tends to remain in the kerf, in intimate contact with a relatively large portion of the cylindrical body throughout the duration of the cutting operation. This factor, however, has surprisingly proven nominal in many applications, while also capable of compensation as discussed hereinabove.

Another aspect of the present invention was the realization that as opposed to the prior art disc blades discussed hereinabove, the present invention achieves sufficient structural integrity without the need to fortify the plastic material with fiber reinforcements. Indeed, bit 10 performed satisfactorily, without bowing or torsional failure, even when subjected to the maximum torque of the drilling machine as occasioned by the bit becoming jammed during test drilling. These results were surprising in light of the constant stresses that core bits are subjected to during drilling operations.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A cutting tool adapted to cut a circular hole in a workpiece, the cutting tool comprising:
   a cutter of substantially cylindrical configuration including an array of cutting elements, said cutter having a cutting end and a coupling end;
   a shaft of substantially cylindrical configuration fabricated from a polymeric material, said shaft having a cutter engagement end and a drill engagement end;
   said cutter and said shaft adapted for concentric, end to end engagement with one another wherein said coupling end is substantially rigidly engaged with said cutter engagement end;
   said drill engagement end being adapted for operative engagement with a drill for rotation of said cutting tool about the concentric axis.

2. The cutting tool as set forth in claim 1, wherein said cutter further comprises a metallic cylinder, said array of cutting elements being disposed about a periphery thereof.

3. The cutting tool as set forth in claim 1, wherein said shaft is substantially tubular and said cutter engagement end and said drill engagement end are both annular.

4. The cutting tool as set forth in claim 1, wherein said cutter is substantially tubular and said cutting end and said coupling end are both annular.

5. The cutting tool as set forth in claim 4, wherein said array of cutting elements comprises a plurality of segments spaced along said annular cutting end.

6. The cutting tool as set forth in claim 4, wherein said array of cutting elements comprises a plurality of teeth spaced along said annular cutting end.

7. The cutting tool as set forth in claim 1, wherein said shaft is substantially solid.

8. The cutting tool as set forth in claim 1, wherein said cutter is substantially solid.

9. The cutting tool as set forth in claim 1, wherein said array of cutting elements comprises a plurality of helical threads.

10. The cutting tool as set forth in claim 1, further comprising a connector concentrically and rigidly disposed on said drill engagement end, said connector adapted to operatively fasten said cutting tool to the drill.

11. The cutting tool as set forth in claim 10, wherein said connector is fabricated from a non-metallic material and further comprises a metallic insert concentrically and rigidly disposed therein, said metallic insert adapted for threadable engagement with the drill.

12. The cutting tool as set forth in claim 10, wherein said connector is fastened to said drill engagement end with an adhesive.

13. The cutting tool as set forth in claim 12, wherein said adhesive is selected from the group consisting of epoxy, urethane, neoprene, nitrile, polyamide, polyester and cyanoacrylate adhesives.

14. The cutting tool as set forth in claim 1, wherein said shaft is fabricated from an unreinforced plastic material.

15. The cutting tool as set forth in claim 1, wherein said shaft is fabricated from a plastic material selected from the group consisting of PVC, Acrylic and nylon.

16. The cutting tool as set forth in claim 1, wherein said shaft is fabricated from a plastic material comprising reinforcing material.

17. The cutting tool as set forth in claim 16, wherein said reinforcing material is fiber selected from the group consisting of carbon fiber, glass fiber, graphite fiber, polyacrylonitrile (PAN) fiber, aramid fiber, boron fiber, silicon carbide fiber, metal fiber, and mixtures thereof.

18. The cutting tool as set forth in claim 16, wherein said reinforcing material is selected from the group consisting of wire mesh, silicon carbide whiskers, silicon nitride whiskers, calcium carbonate particles, aluminum silicate particles, aluminum oxide particles, silicon carbide particles, and mixtures thereof.

19. The cutting tool as set forth in claim 1, wherein said cutter engagement end and said coupling end are engaged with one another in a manner selected from the group consisting of bonding with an adhesive, melt lamination, mechanical interlocking, riveting, molding in-situ, welding, and combinations thereof.

20. The cutting tool as set forth in claim 19, wherein the cutter engagement end is bonded to the coupling end with an adhesive.

21. The cutting tool as set forth in claim 20, wherein said adhesive is selected from the group consisting of epoxy, urethane, neoprene, nitrile, polyamide, polyester and cyanoacrylate adhesives.

22. The cutting tool as set forth in claim 1, wherein:
said shaft has a peripheral shaft diameter;
said cutter has a peripheral cutter diameter; and
during rotation of said cutting tool, said array of cutting elements defines a notional cylinder having a notional outer diameter greater than said peripheral shaft diameter and said peripheral cutter diameter;
wherein radial clearance is provided between the workpiece and said shaft, and between the workpiece and said cutter during cutting of the hole.

23. The cutting tool as set forth in claim 20, wherein:
said shaft is tubular, having a shaft wall of predetermined thickness;
said cutter is tubular, having a cutter wall of predetermined thickness; and
said predetermined thickness of said shaft wall is substantially equal to said predetermined thickness of said cutter wall.

24. The cutting tool as set forth in claim 22, further comprising:
said peripheral shaft diameter being greater than said peripheral cutter diameter;
wherein reduction of said peripheral shaft diameter due to wear during operation of said cutting tool is compensated.

25. The cutting tool as set forth in claim 24, wherein:
said shaft is tubular, having a shaft wall of predetermined thickness;
said cutter is tubular, having a cutter wall of predetermined thickness; and
said predetermined thickness of said shaft wall is greater than said predetermined thickness of said cutter wall.

26. The cutting tool as set forth in claim 25, wherein:
said notional cylinder has a notional inner diameter;
said shaft has an inner shaft diameter;
said cutter has an inner cutter diameter;
said inner cutter diameter being greater than said inner shaft diameter, and said inner shaft diameter being greater than said notional inner diameter;
wherein clearance is provided between said notional inner diameter and said inner shaft diameter, and between said notional inner diameter and said inner cutter diameter, so that increase in said inner shaft diameter due to wear during core drilling operation of said cutting tool is compensated.

27. A polymeric body for a cutting tool adapted to cut a circular hole in a workpiece, the cutting tool having a cutter of substantially cylindrical configuration including an array of cutting elements, the cutter having a cutting end and a coupling end, said polymeric body comprising:
a shaft of substantially cylindrical configuration having a cutter engagement end and a drill engagement end;
said shaft adapted for concentric, end to end engagement with the cutter wherein said cutter engagement end is substantially rigidly engaged with the coupling end;
said drill engagement end adapted for operative engagement with a drill for rotation of the cutting tool about the concentric axis.

28. The polymeric body as set forth in claim 27, wherein the cutter further comprises a metallic cylinder, said array of cutting elements being disposed about a periphery thereof.

29. The polymeric body as set forth in claim 27, wherein said shaft is substantially tubular and said cutter engagement end and said drill engagement end are both annular.

30. The polymeric body as set forth in claim 27, wherein the cutter is substantially tubular and the cutting end and the other end are both annular.

31. The polymeric body as set forth in claim 27, further comprising a connector concentrically and rigidly disposed on said drill engagement end, said connector adapted to operatively fasten the cutting tool to the drill.

32. The polymeric body as set forth in claim 31, wherein said connector is fabricated from a non-metallic material and further comprises a metallic insert adapted for threadable engagement with the drill.

33. The polymeric body as set forth in claim 32, wherein said connector is fastened to said drill engagement end with an adhesive.

34. The polymeric body as set forth in claim 27, wherein said shaft is fabricated from a plastic material selected from the group consisting of PVC, Acrylic and nylon.

35. The polymeric body as set forth in claim 27, wherein said shaft is fabricated from a fiber reinforced plastic material, said fiber being selected from the group consisting of carbon fiber, glass, polyacrylonitrile (PAN) fiber, and mixtures thereof.

36. The polymeric body as set forth in claim 27, wherein a fastener having a male coupling end and a female coupling end is disposed on the coupling end of the cutter and is fastened to the cutter engagement end.

37. The polymeric body as set forth in claim 36, wherein the male coupling end and the female coupling end of the fastner are fastened with an adhesive to the coupling end of the cutter and to the cutter engagement end.

38. A method of drilling a hole in a workpiece, comprising the steps of:
(a) providing a cutting tool comprising:
i) a cutter of substantially cylindrical configuration including an array of cutting elements, said cutter having a cutting end and a coupling end;
ii) a shaft of substantially cylindrical configuration fabricated from a polymeric material, said shaft having a cutter engagement end and a drill engagement end; and
iii) said cutter and said shaft adapted for concentric, end to end engagement with one another wherein said coupling end is substantially rigidly engaged with said cutter engagement end;
(b) fastening said drill engagement end to a drill;
(c) operating the drill to rotate said cutting tool about the concentric axis; and
(d) engaging said cutting end with the workpiece.

39. The method as set forth in claim 38, wherein during rotation of the cutting tool, the array of cutting elements defines a notional cylinder having a notional outer diameter, said method further comprising the step of:
providing the shaft with a peripheral shaft diameter less than the notional outer diameter; and
providing the cutter with a peripheral cutter diameter less than the notional outer diameter;
wherein radial clearance is provided between the workpiece and the shaft and between the workpiece and the cutter during cutting of the hole.

40. A cutting tool adapted to cut a circular hole in a workpiece, the cutting tool comprising:

a cutter of substantially cylindrical configuration including an array of cutting elements, said cutter having a cutting end and a coupling end;

a shaft of substantially cylindrical configuration fabricated from a non-metallic material, said shaft having a cutter engagement end and a drill engagement end, said cutter and said shaft adapted for concentric, end to end engagement with one another wherein said coupling end is substantially rigidly engaged with said cutter engagement end;

a connector concentrically and rigidly disposed on said drill engagement end, said connector being fabricated from a non-metallic material and having a metallic insert concentrically and rigidly disposed therein, said metallic insert adapted for operative engagement with the drill for rotation of said cutting tool about the concentric axis.

41. A cutting tool adapted to cut a circular hole in a workpiece, the cutting tool comprising:

a cutter of substantially cylindrical configuration including an array of cutting elements, said cutter having a cutting end and a coupling end;

a shaft of substantially cylindrical configuration fabricated from a non-metallic material, said shaft having a cutter engagement end and a drill engagement end, said drill engagement end being adapted for operative engagement with a drill for rotation of said cutting tool about the concentric axis;

said cutter and said shaft adapted for concentric, end to end engagement with one another wherein said coupling end is substantially rigidly engaged with said cutter engagement end in a manner selected from the group consisting of bonding with an adhesive, melt lamination, mechanical interlocking, molding in-situ, welding, and combinations thereof.

42. A cutting tool adapted to cut a circular hole in a workpiece, the cutting tool comprising:

a cutter of substantially tubular configuration including an array of cutting elements, said cutter having a cutting end, a coupling end, and an inner cutter diameter;

a shaft of substantially tubular configuration fabricated from a non-metallic material, said shaft having a cutter engagement end, a drill engagement end, and an inner shaft diameter;

said cutter and said shaft adapted for concentric, end to end engagement with one another wherein said coupling end is substantially rigidly engaged with said cutter engagement end;

said drill engagement end being adapted for operative engagement with a drill for rotation of said cutting tool about the concentric axis, wherein during rotation of said cutting tool, said array of cutting elements defines a notional cylinder having a notional inner diameter;

said inner cutter diameter being greater than said inner shaft diameter, and said inner shaft diameter being greater than said notional inner diameter;

wherein clearance is provided between said notional inner diameter and said inner shaft diameter, and between said notional inner diameter and said inner cutter diameter, so that increase in said inner shaft diameter due to wear during core drilling operation of said cutting tool is compensated.

43. A non-metallic body for a cutting tool adapted to cut a circular hole in a workpiece, the cutting tool having a cutter of substantially cylindrical configuration including an array of cutting elements, the cutter having a cutting end and an other end, said non-metallic body comprising:

a shaft of substantially cylindrical configuration having a cutter engagement end and a drill engagement end;

said shaft adapted for concentric, end to end engagement with the cutter wherein said cutter engagement end is substantially rigidly engaged with the other end;

a connector concentrically and rigidly disposed on said drill engagement end, said connector adapted to operatively fasten the cutting tool to a drill, said connector being fabricated from a non-metallic material and having a metallic insert adapted for threadable engagement with the drill for rotation of the cutting tool about the concentric axis.

44. A method of drilling a hole in a workpiece, comprising the steps of:

(a) providing a cutting tool comprising:
  i) a cutter of substantially cylindrical configuration including an array of cutting elements, said cutter having a cutting end and a coupling end;
  ii) a shaft of substantially cylindrical configuration fabricated from a non-metallic material, said shaft having a cutter engagement end and a drill engagement end; and
  iii) said cutter and said shaft adapted for concentric, end to end engagement with one another wherein said coupling end is substantially rigidly engaged with said cutter engagement end;
  iv) wherein during rotation of the cutting tool, the array of cutting elements defines a notional cylinder having a notional outer diameter;
  v) the shaft having a peripheral shaft diameter less than the notional outer diameter; and
  vi) the cutter having a peripheral cutter diameter less than the notional outer diameter;
  vii) wherein radial clearance is provided between the workpiece and the shaft and between the workpiece and the cutter during cutting of the hole;

(b) fastening said drill engagement end to a drill;

(c) operating the drill to rotate said cutting tool about the concentric axis; and (d) engaging said cutting end with the workpiece.

* * * * *